(12) United States Patent
Jepsen et al.

(10) Patent No.: US 8,314,907 B2
(45) Date of Patent: Nov. 20, 2012

(54) TRANSFLECTIVE DISPLAY SUB-PIXEL STRUCTURES WITH TRANSMISSIVE AREA HAVING DIFFERENT SIZES AND REFLECTIVE AREA HAVING EQUAL SIZES

(75) Inventors: Mary Lou Jepsen, Sausalito, CA (US); Carlin J. Vieri, Menlo Park, CA (US); Ruibo Lu, San Bruno, CA (US)

(73) Assignee: Pixel QI Corporation, San Bruno, CA (US)

( * ) Notice: Subject to any disclaimer, the term of this patent is extended or adjusted under 35 U.S.C. 154(b) by 344 days.

(21) Appl. No.: 12/712,439

(22) Filed: Feb. 25, 2010

(65) Prior Publication Data

US 2011/0025960 A1     Feb. 3, 2011

Related U.S. Application Data

(63) Continuation-in-part of application No. 12/510,485, filed on Jul. 28, 2009.

(51) Int. Cl.
*G02F 1/1335* (2006.01)
*G09G 3/36* (2006.01)

(52) U.S. Cl. ............ 349/114; 349/106; 349/113; 345/88

(58) Field of Classification Search .................. 349/106, 349/113–114; 345/88
See application file for complete search history.

(56) References Cited

U.S. PATENT DOCUMENTS

| | | | |
|---|---|---|---|
| 5,748,828 A | 5/1998 | Steiner et al. | |
| 6,341,002 B1 | 1/2002 | Shimizu et al. | |
| 6,801,274 B2 * | 10/2004 | Suzuki | 349/106 |
| 6,930,664 B2 | 8/2005 | Kim et al. | |
| 7,008,409 B2 | 3/2006 | Spiezio et al. | |
| 7,030,946 B2 * | 4/2006 | Iijima et al. | 349/106 |
| 7,196,766 B2 | 3/2007 | Yang et al. | |
| 7,248,315 B2 | 7/2007 | Arai et al. | |

(Continued)

FOREIGN PATENT DOCUMENTS

JP     2003-248221 A     9/2003

(Continued)

OTHER PUBLICATIONS

Korean Intellectual Property Office, "International Search report and written opinion", in application No. PCT/US2011/047520, dated Apr. 9, 2012, 9 pages.

(Continued)

*Primary Examiner* — Hoan C Nguyen
(74) *Attorney, Agent, or Firm* — Hickman Palermo Truong Becker Bingham Wong LLP

(57) ABSTRACT

A liquid crystal display comprises a plurality of pixels, each pixel comprising three or more sub-pixels. A first sub-pixel of the three or more sub-pixels comprises a first transmissive part that has a first transmissive area, and a first reflective part having a first reflective area. A second sub-pixel comprises a second transmissive part that has a second transmissive area, and a second reflective part that has a second reflective area. A third sub-pixel comprises a third transmissive part that has a third transmissive area, and a third reflective part that has a third reflective area. At least two among the first transmissive area, the second transmissive area, and the third transmissive area are different in size. The first reflective area, the second reflective area, and the third reflective area are equal in size.

23 Claims, 6 Drawing Sheets

U.S. PATENT DOCUMENTS

| | | | |
|---|---|---|---|
| 7,358,943 B2 | 4/2008 | Asao | |
| 7,388,635 B2 | 6/2008 | Aoki | |
| 7,463,327 B2 | 12/2008 | Tasaka et al. | |
| 7,746,431 B2 | 6/2010 | Jepsen | |
| 2002/0145688 A1 | 10/2002 | Sekiguchi | |
| 2002/0154257 A1* | 10/2002 | Iijima | 349/67 |
| 2004/0201560 A1 | 10/2004 | Shen et al. | |
| 2004/0201814 A1 | 10/2004 | Yamamoto | |
| 2004/0252092 A1 | 12/2004 | Roosendaal | |
| 2005/0083453 A1* | 4/2005 | Nakano et al. | 349/106 |
| 2005/0174514 A1 | 8/2005 | Iijima | |
| 2006/0044240 A1 | 3/2006 | Takizawa et al. | |
| 2006/0139530 A1 | 6/2006 | Ukawa et al. | |
| 2006/0274236 A1 | 12/2006 | Chai et al. | |
| 2007/0046606 A1 | 3/2007 | Kim et al. | |
| 2007/0164953 A1 | 7/2007 | Huang et al. | |
| 2007/0165169 A1 | 7/2007 | Jang et al. | |
| 2007/0242197 A1 | 10/2007 | Watson et al. | |
| 2008/0030656 A1 | 2/2008 | Watson et al. | |
| 2008/0043185 A1 | 2/2008 | Jeng et al. | |
| 2008/0074592 A1 | 3/2008 | Araki et al. | |
| 2008/0117346 A1 | 5/2008 | Jepsen | |
| 2010/0014032 A1 | 1/2010 | Jepsen | |
| 2010/0020054 A1 | 1/2010 | Jepsen | |
| 2010/0073332 A1 | 3/2010 | Gettemy et al. | |
| 2010/0110351 A1 | 5/2010 | Kim et al. | |
| 2010/0225855 A1 | 9/2010 | Lu | |
| 2012/0039034 A1 | 2/2012 | Jepsen et al. | |

FOREIGN PATENT DOCUMENTS

| | | |
|---|---|---|
| JP | 2004-045757 A | 2/2004 |
| JP | 2004-163893 A | 6/2004 |
| JP | 2004-279765 A | 10/2004 |
| KR | 10-2002-0051858 | 6/2002 |
| KR | 10-20040068398 | 7/2004 |
| KR | 10-2007-0054109 | 5/2007 |
| KR | 10-2009-0035868 | 4/2009 |

OTHER PUBLICATIONS

Current Claims in application No. PCT/2011/047520, dated Apr. 2012, 4 pages.
International Searching Authority, "International Search Report and Written Opinion", application No. PCT/US2009/050787, dated Feb. 17, 2010, 10 pages.
Current Claims, application No. PCT/US2009/050787, 4 pages.
International Searching Authority, "International Search Report and Written Opinion", application No. PCT/US2009/051946, dated Mar. 3, 2010, 15 pages.
Current Claims, application No. PCT/US2009/051946, 11 pages.
International Searching Authority, "International Search Report and Written Opinion", application No. PCT/US2009/051950, dated Mar. 15, 2010, 10 pages.
Current Claims, application No. PCT/US2009/051950, 6 pages.
Wu, S.T., et al., "Mixed-Mode Twisted Nematic Liquid Crystal Cells for Reflective Displays", Applied Physics Letters, vol. 68, published Jan. 1996, 3.
Wright, et al., "Resolution and Legibility: A comparison of TFTLCDs and CRTs", SID Digest, 1999, 4 pages.
Yoshitake, et al., "The Relationship between Pixel Density and Readability on Computer Displays—Effectiveness of an Anti-Aliased Front on a High Density LCD", SID Digest, 2003, 4 pages.
International Searching Authority, "International Search Report and Written Opinion", application No. PCT/US2010/025439, dated Oct. 4, 2010, 12pages.
Current Claims, application No. PCT/US2010/025439, 6 pages.

* cited by examiner

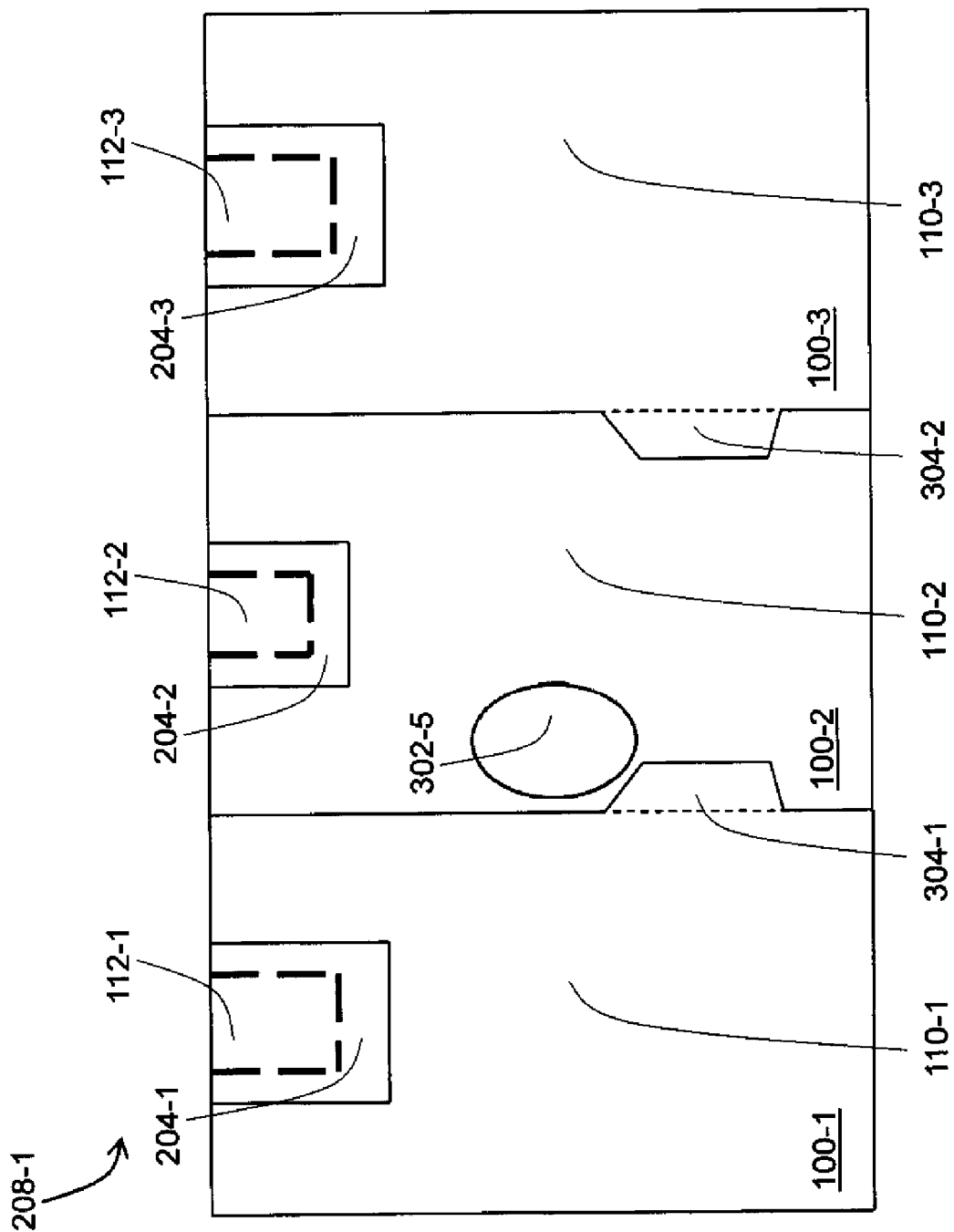

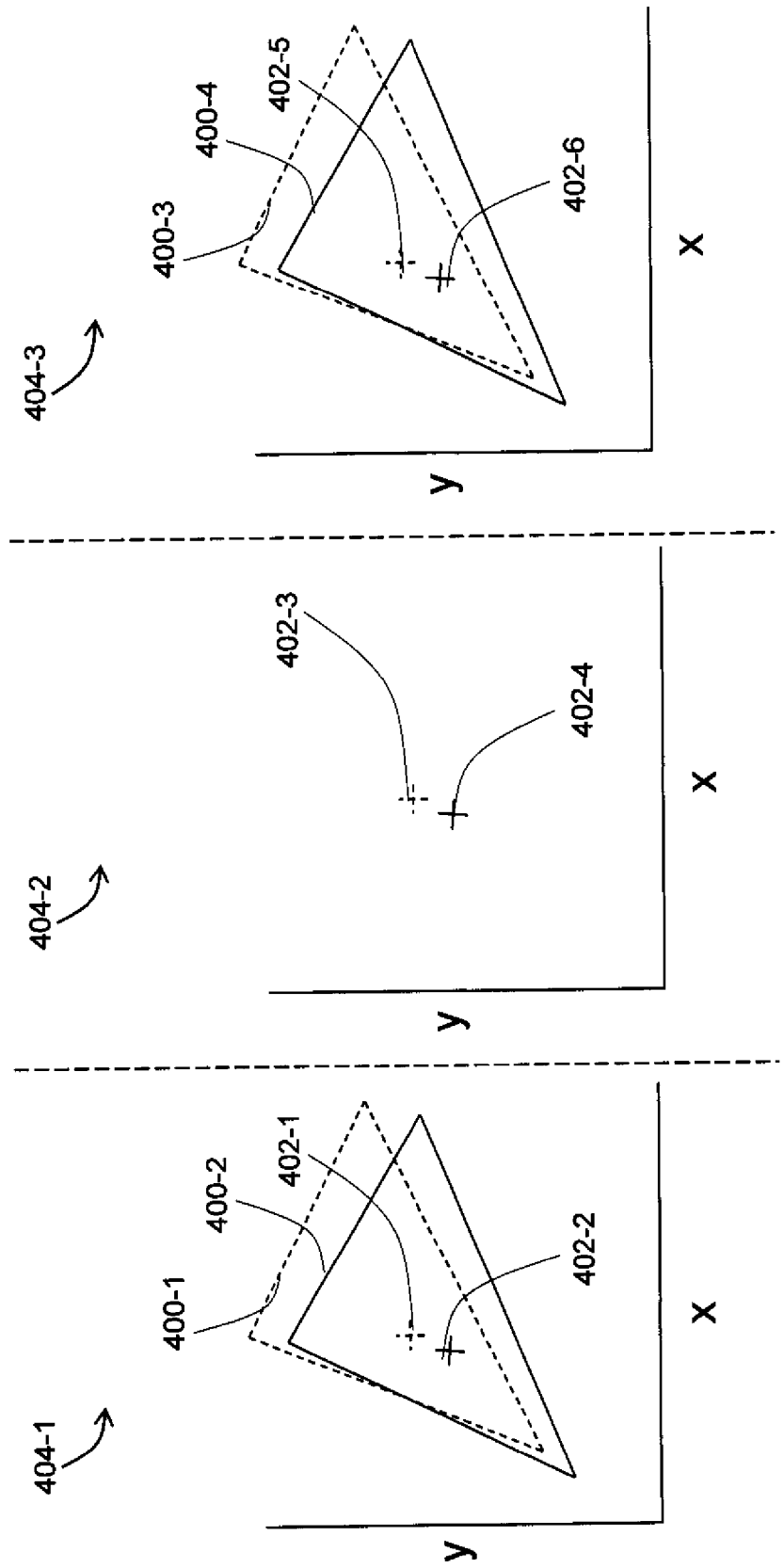

TRANSFLECTIVE DISPLAY SUB-PIXEL STRUCTURES WITH TRANSMISSIVE AREA HAVING DIFFERENT SIZES AND REFLECTIVE AREA HAVING EQUAL SIZES

BENEFIT CLAIM

This application claims domestic priority as a continuation-in-part of co-pending application Ser. No. 12/510,485, filed Jul. 28, 2009, the entire contents of which are hereby incorporated by reference for all purposes as if fully set forth herein.

CROSS REFERENCE TO RELATED APPLICATIONS

This application is related to U.S. patent application Ser. No. 12/503,793, filed Jul. 15, 2009; U.S. patent application Ser. No. 12/560,217, filed Sep. 15, 2009, the entire contents of which are hereby incorporated by reference for all purposes as if fully disclosed herein.

TECHNICAL FIELD

The present disclosure generally relates to improvements in pixel structures of a Liquid Crystal Display (LCD).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An LCD comprises a number of optical components that may have optical responses that vary for different light wavelengths. As a result, images on the LCD, as perceived by human eyes, may appear with color distortions or tinges. Optical components used in an LCD may be optimized for the middle of the visible light spectrum. Compared with green light, which lies generally in the middle of the spectrum, red and/or blue light may not transmit well. Thus, many LCDs may look greenish even when displaying black-and-white or grayscale images.

Some LCDs can operate with more than one light source individually or in combination. For example, a transflective LCD may source light from a backlight unit, ambient light, or both. In these LCDs, the ambient light may take a reflective optical path while the backlight may take a transmissive optical path that is separate and different from the reflective optical path. Intensities may be different for ambient light and backlight depending on lighting conditions in the operating environment. These differences cause further divergence in optical responses to the ambient light and to the backlight at different light wavelengths. As a result, color tinges in the same transflective LCD may further vary with lighting conditions, resulting in a viewing experience that is not ideal.

BRIEF DESCRIPTION OF THE DRAWINGS

In the drawings:

FIG. 3A illustrates an example top plan view, in schematic format, of sub-pixels in a pixel to adjust white points with one or more reflective part color filters;

FIG. 4 illustrates examples of color gamut and white point relating to sub-pixels in a pixel.

Figure 1:
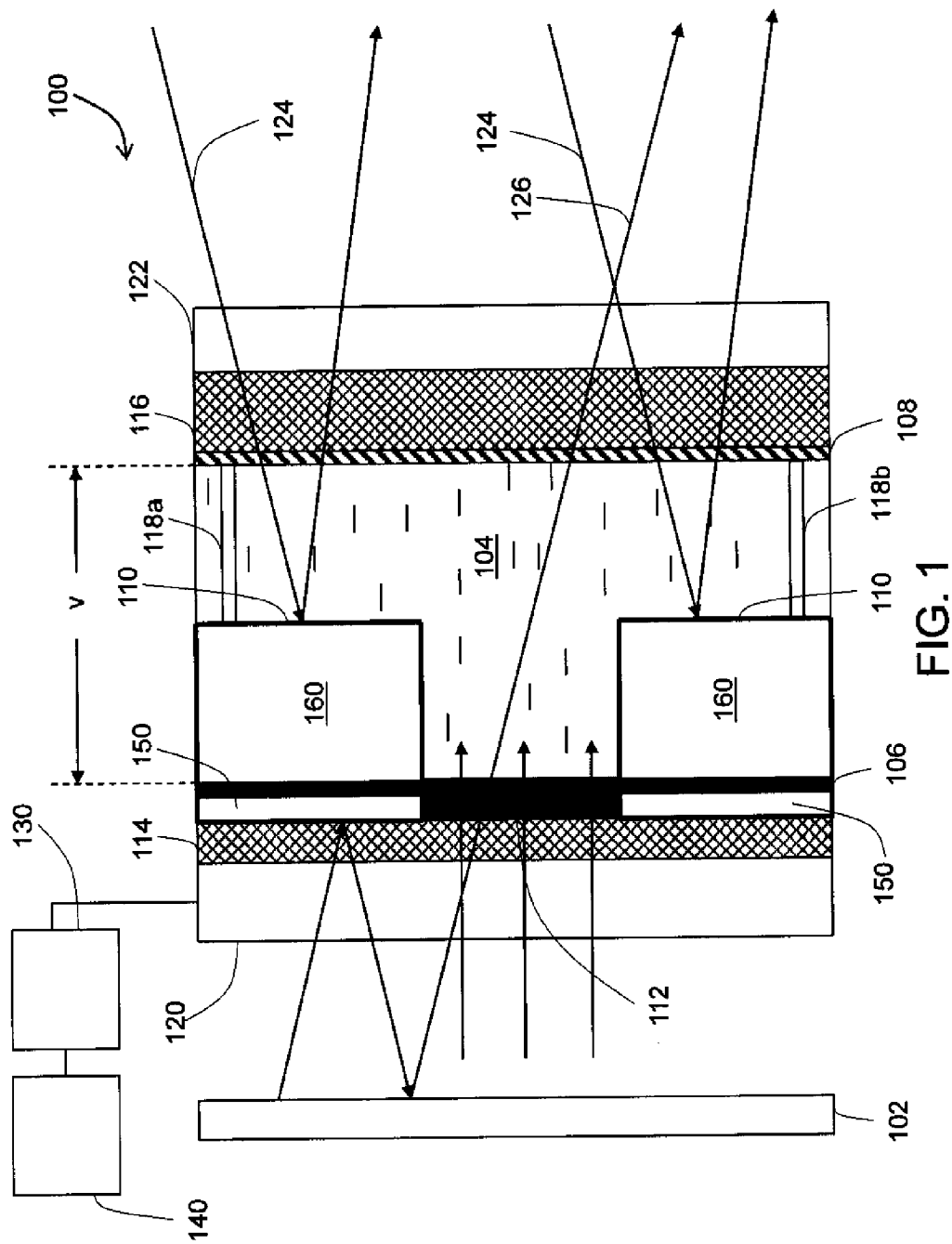
FIG. 1 is a schematic of an example cross-sectional structure of a sub-pixel.

The drawings are not rendered to scale.

DETAILED DESCRIPTION

1. General Overview

In an embodiment, a liquid crystal display (LCD) comprises a plurality of pixels, each pixel comprising three or more sub-pixels. A first sub-pixel of the three or more sub-pixels comprises a first transmissive part that has a first transmissive area, and a first reflective part having a first reflective area. A second sub-pixel comprises a second transmissive part that has a second transmissive area, and a second reflective part that has a second reflective area. A third sub-pixel comprises a third transmissive part that has a third transmissive area, and a third reflective part that has a third reflective area. At least two among the first transmissive area, the second transmissive area, and the third transmissive area are different in size. As used herein, the term "different" may mean that the difference in area sizes of the largest transmissive area and the smallest transmissive area in a pixel relative to a nominal area size exceeds a certain threshold. In an embodiment, this threshold may be 2%. In another embodiment, this threshold may be 5%. In yet another embodiment, this threshold may be 10%. In various other embodiments, this threshold may be less or more than these example threshold values. The first reflective area, the second reflective area, and the third reflective area are equal in size.

In an embodiment, the first transmissive part is covered by a first transmissive part color filter, the second transmissive part is covered by a second transmissive part color filter, and the third transmissive part is covered by a third transmissive part color filter. The first transmissive part color filter, the second transmissive part color filter, and the third transmissive part color filter impart three different colors. In an embodiment, the first transmissive area and the second transmissive area are different in size.

In an embodiment, in the LCD, a first reflective portion of the first reflective area is not covered by any color filter; a second reflective portion of the second reflective area is not covered by any color filter; and a third reflective portion of the third reflective area is not covered by any color filter. In an embodiment, the first reflective portion, the second reflective portion, and the third reflective portion are substantially similar in area size.

In an embodiment, in the LCD, the first transmissive area, the second transmissive area, and the third transmissive area comprise sizes that are configured for a particular white point in a transmissive operating mode. In an embodiment, transmission efficiencies of the first transmissive part, the second transmissive part, and the third transmissive part may be different. Sizes of the first transmissive area, the second transmissive area, and the third transmissive area are configured to two or more different sizes, in part based on these transmission efficiencies and the differences there between.

In an embodiment, in the LCD, at least two among the first transmissive area, the second transmissive area, and the third transmissive area are different in size, while the first reflective area, the second reflective area, and the third reflective area are equal in size.

In an embodiment, in the LCD, the first reflective part is covered partially by one or more first reflective part color filters. At least one of the first reflective part color filters imparts a color different from the first transmissive part color filter.

In an embodiment, in the LCD, area sizes of the first reflective part color filters are configured for a particular white point in a reflective operating mode.

In an embodiment, in the LCD, the second reflective part is covered partially by zero or more second reflective part color filters, and the third reflective part is covered partially by zero or more third reflective part color filters.

In an embodiment, in the LCD, area sizes of the first reflective part color filters, the second reflective part color filters, and the third reflective part color filters, and area sizes of the first transmissive part, the second transmissive part, and the third transmissive part, are configured for a particular white point in a transflective operating mode.

In an embodiment, in the LCD, a particular first reflective part color filter partially covering the first reflective part of the first sub-pixel is formed contiguously with a particular second reflective part color filter partially covering the second reflective part of the second sub-pixel.

In an embodiment, in the LCD, the first transmissive part color filter partially covers the first reflective part of the first sub-pixel.

In an embodiment, transmissive part color filters and reflective part color filters as described herein may be of different thicknesses. In an embodiment, some, or all, of transmissive part color filters and reflective part color filters as described herein may be of a same thickness.

In an embodiment, an LCD as described herein further comprises one or more colorless spacers placed over a reflective part as described herein. In an embodiment, some, or all, of the one or more colorless spacers are of a same thickness. In an embodiment, the one or more colorless spacers are of different thicknesses.

In an embodiment, an LCD as described herein further comprises a driver circuit to provide pixel values to a plurality of switching elements, wherein the plurality of switching elements determines the light transmitting through transmissive parts. In an embodiment, the driver circuit further comprises a Transistor-Transistor-Logic interface. In an embodiment, the LCD further comprises a timing control circuit to refresh the pixel values of the LCD.

In an embodiment, an LCD as described herein forms a part of a computer, including but not limited to a laptop computer, notebook computer, ebook reader, cell phone, and netbook computer.

Various embodiments relate to an LCD that is capable of functioning in a transmissive operating mode, a reflective operating mode, a transflective operating mode, or other modes. An LCD as described herein may be normally white or normally black. An LCD as described herein may comprise pixels with any cross-sectional structures and/or any cross-sectional substructures. Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Introduction

FIG. 1 is a schematic of an example cross-section structure of a sub-pixel 100 of an LCD.

In an embodiment, sub-pixel 100 comprises a liquid crystal material 104, a first electrode layer 106 that is a sub-pixel electrode and that includes switching elements, a second electrode layer 108 that is a common electrode, a first reflective layer 160 that is located on one side of the electrode 106 as illustrated, a second reflective layer 150 that is located on the other side of the electrode 106 as illustrated and that may or may not be electrically connected with the electrode 106, a transmissive part 112, first and second substrate layers 114, 116, spacers 118a, 118b, a first polarization layer 120, and a second polarization layer 122.

In an embodiment, first and second reflective layers 160, 150 have an opening over the transmissive part 112. A surface of first reflective layer 160 forms in part a reflective part 110. A surface of second reflective layer 150 may be used to reflect light incident from the left-hand side of the surface. In an embodiment, a light source 102 and/or ambient light 124 illuminates sub-pixel 100. Examples of light source 102 include, but are not limited to, Light Emitting Diodes backlights (LEDs), Cold-Cathode Fluorescent Lamps backlights (CCFLs), and the like. Ambient light 124 can be sunlight or any external source of light.

In an embodiment, liquid crystal material 104, which is an optically active material, rotates the axis of the polarization of the light from light source 102 or ambient light 124. Liquid crystal material 104 can be a Twisted Nematic (TN), an Electrically Controlled Birefringence (ECB) and the like. In an embodiment, the rotation of the polarization orientation of the light is determined by the potential difference applied between sub-pixel electrode 106, and common electrode 108. In an embodiment, sub-pixel electrode 106 and common electrode 108 can be made of Indium Tin Oxide (ITO). Further, each sub-pixel is provided with a sub-pixel electrode 106, while common electrode 108 is common to all the sub-pixels and pixels present in the LCD.

In an embodiment, reflective part 110 is electrically conductive and reflects ambient light 124 to illuminate sub-pixel 100 dependent on the modulation of the liquid crystal material 104. The first reflective layer 160 is made of metal and is electrically coupled to sub-pixel electrode 106 thereby providing the potential difference between reflective part 110 and common electrode 108. Transmissive part 112 transmits light from light source 102 to illuminate sub-pixel 100 dependent on the modulation of the liquid crystal material 104. Substrates 114, 116 enclose liquid crystal material 104, pixel electrode 106 and common electrode 108. In an embodiment, sub-pixel electrode 106 may be located at or close to substrate 114 and may or may not be separated from substrate 114 by additional layers comprising wirings and transistors, and common electrode 108 is located at substrate 116. Additionally, substrate 114 and sub-pixel electrode layer 106 comprises switching elements (not shown in FIG. 1). In an embodiment, the switching elements can be Thin Film Transistors (TFTs). In another embodiment the switching elements can be low temperature polysilicon.

A driver circuit 130 sends signals related to sub-pixel values to the switching elements. In an embodiment, driver circuit 130 may output analog high (for example, ~20V) voltage signals. Additionally, a timing controller 140 encodes the signals related to sub-pixel values into the signals needed by the transmissive and/or reflective parts of the sub-pixels. Furthermore, timing controller 140 may have a memory to allow self-refresh of the LCD when the signals related to the sub-pixels are removed from timing controller 140.

In an embodiment, spacers 118a, 118b are placed over reflective part 110 to maintain a uniform distance between substrates 114, 116. Additionally, sub-pixel 100 comprises first polarizer 120 and second polarizer 122. In an embodiment, the axes of polarity of first polarizer 120 and second polarizer 122 are perpendicular to each other. In another embodiment, the axes of polarity of first polarizer 120 and second polarizer 122 are parallel to each other.

Sub-pixel 100 is illuminated by light source 102 and/or ambient light 124. The intensity of light passing through or reflected from sub-pixel 100 is determined by the potential difference between sub-pixel electrode 106, and common electrode 108. In an embodiment, liquid crystal material 104 is in a disoriented state and the light passing through first polarizer 120 is blocked by second polarizer 122 when no potential difference is applied between sub-pixel electrode 106, and common electrode 108. Liquid crystal material 104 is oriented when the potential difference is applied between sub-pixel electrode 106, and common electrode 108. The orientation of liquid crystal material 104 allows the light to pass through second polarizer 122.

In an embodiment, first reflective layer 160 is placed on one side of electrode 106, while second reflective layer 150 may be placed on the opposite side of electrode 106. The second reflective layer 150 may be made of metal, reflecting or bouncing light 126, as incident from the left-hand side of FIG. 1, one or more times until the light 126 transmits through the transmissive part 112 to illuminate sub-pixel 100.

For the purpose of illustrating a clear example, straight lines indicate light path segments of lights 112, 124, 126. Each of the light path segments may comprise additional bending due to diffractions which may occur when lights 112, 124, 126 travel through junctions between media of different refractive indexes.

For the purpose of illustrating a clear example, the sub-pixel 100 is illustrated with two spacers 118a, 118b. In various embodiments, two neighboring spacers may be placed one or more pixels apart, every ten pixels apart, every twenty pixels apart, every 100 pixels apart, or other distances apart.

For the purpose of illustrating a clear example, the sub-pixel 100 is illustrated as having an example cross-sectional structure of FIG. 1. In various embodiments, a sub-pixel as described herein may have a different cross-sectional structure other than FIG. 1. For example, a sub-pixel as described herein may have cross-sectional structures described in U.S. patent application Ser. No. 12/560,217. A sub-pixel of a LCD as described herein may be normally black, or normally white.

For the purpose of illustrating a clear example, the reflective part 110 is shown as a smooth straight line. Alternatively, the reflective part 110 may have a roughened or bumpy surface at the micron level or sub-micron levels.

3. White Point Adjustment Using Transmissive Parts with Different Areas

Figure 2:
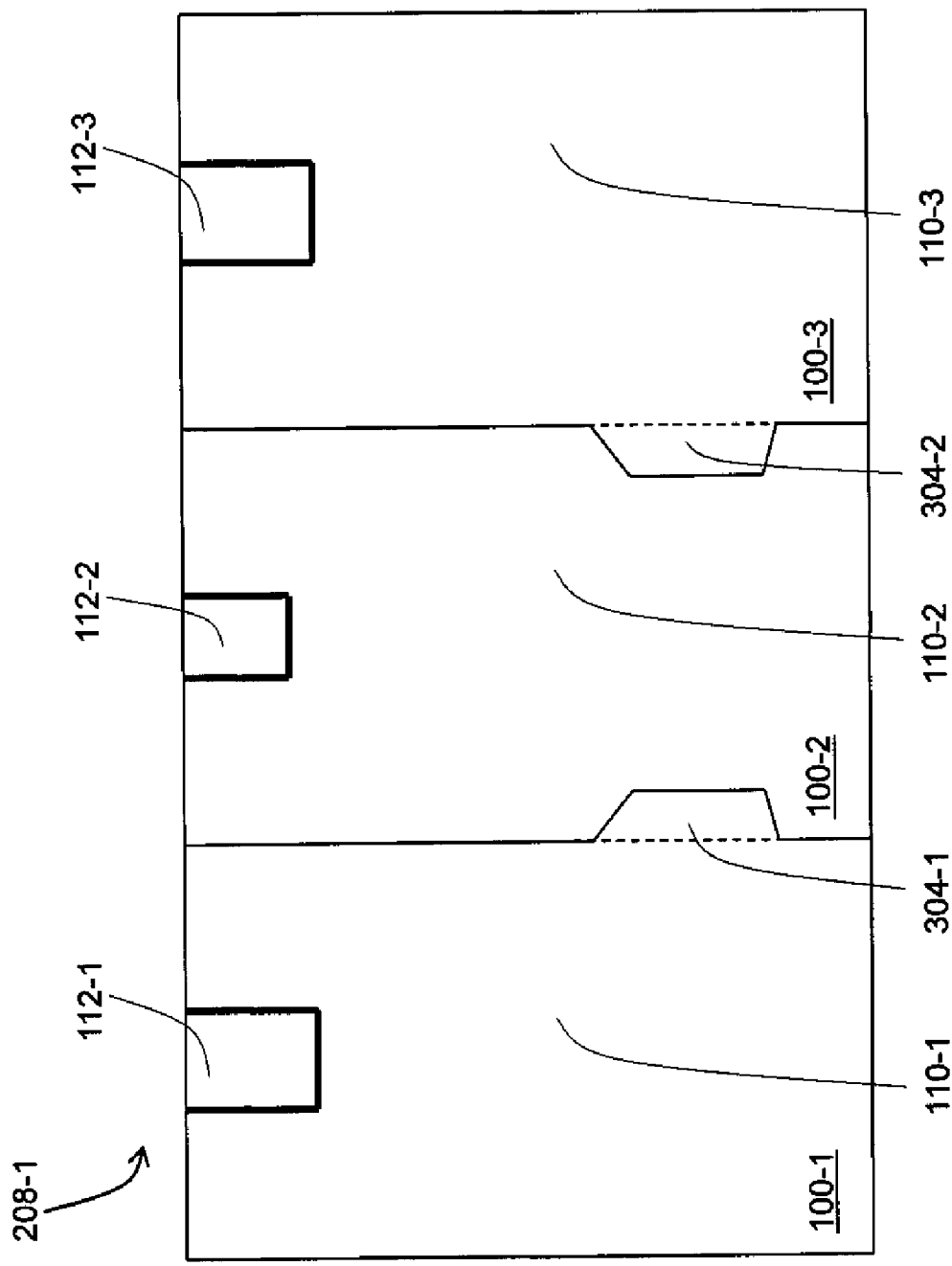
FIG. 2. Illustrates an example top view structure of sub-pixels in a pixel to size transmissive parts.

FIG. 2 illustrates an example top-view structure of an example pixel 208-1, according to an embodiment. A pixel may comprise three or more sub-pixels. In the example of FIG. 2, pixel 208-1 comprises three sub-pixels 100-1, 100-2, 100-3. Each of sub-pixels 100-1, 100-2, 100-3 comprises a respective transmissive part 112-1, 112-2, 112-3, and a respective reflective part 110-1, 110-2, 110-3. The pixel may contain areas that are not optically active. For example, between sub-pixels, additional insulation area may be provided in some embodiments.

A transmissive part as described herein may or may not be covered fully or partially by color filters. In some embodiments illustrated in FIG. 2, no color filters are used. In these embodiments, one or more colored light sources may provide light to the transmissive parts 112-1, 112-2, 112-3. For example, a red light source may be used for the transmissive part 112, a green light source may be used for the transmissive part 112-2, and a blue light source may be used for the transmissive part 112-3. In other embodiments, other color systems may be used and/or a different combination of colored light sources may be used.

The amount of light from light source 102 transmitting through each of the transmissive parts 112-1, 112-2, 112-3 is determined by switching elements that are omitted from FIG. 2 for clarity. The amount of light transmitting through transmissive parts 112-1, 112-2, 112-3, in turn, determines the luminance and color of the color pixel. Further, the shape of transmissive parts 112-1, 112-2, 112-3 may be any shape such as a circle, half circle, rectangle, triangle, hexagon, pentagon, etc., or a combination of various shapes.

It may be desirable to adjust the white point of the transmissive parts 112-1, 112-2, 112-3 of the pixel 208-1. The white point is the color coordinate of the light transmitted through the transmissive parts 112-1, 112-2, 112-3 of the pixel 208-1 when all the transmissive parts are driven to be as fully or nearly as fully as possibly transmissive. If the transmissive parts of each subpixel transmit equal amounts of light, the viewer will observe a white image. If the light is transmitted unequally, the resulting image may have an undesirable color tinge, such as appearing too green or too yellow. This tinge may be removed by adjusting the amount of light passed through each transmissive part by adjusting the sizes of the transmissive parts.

Areas of the transmissive parts 112-1, 112-2, 112-3, as seen in the top plan view of FIG. 2, may be configured based on the desired light transmission and the transmission efficiencies per unit area of the sub-pixels 100-1, 100-2, 100-3. To determine the sizes of the areas of transmissive parts 112-1, 112-2, 112-3, transmission efficiencies of the transmissive parts per unit area may be individually determined under a controlled lighting condition. For example, under a particular light source, a maximum amount of light transmitted through each sub-pixel in the pixel 208-1 as viewed by a viewer from top may be measured or calculated for each such sub-pixel. Similarly, a minimum amount of light—light leakage, for example—transmitted through each sub-pixel may also be measured or calculated. Additionally and/or optionally, other types of transmission efficiency for a sub-pixel may also be taken or derived from measurement. In various embodiments, other types of transmission efficiency for a sub-pixel, such as average, ¾ of maximum, etc., may also be taken or derived from measurement.

In some embodiments in which a RGB color system is used, the area size of a green transmissive part in a pixel may be set to 100% relative to a nominal transmissive area size. The green transmissive part may be in sub-pixel 100-2 while a red transmissive part may be in sub-pixel 100-1. In a particular embodiment, if the red transmissive part of the pixel has a transmission efficiency of 90% relative to the transmission efficiency of the green transmissive part in the sub-pixel 100-2, then the area of the red transmissive part may be configured to 100% divided by 90% relative to the nominal transmissive area.

Similarly, if a blue transmissive part of the pixel, for example, in sub-pixel 100-3, has a transmission efficiency of 95% relative to the transmission efficiency of the green transmissive part, then the area of the blue transmissive part may be set to 100% divided by 95% relative to the nominal transmissive area. The transmission efficiencies that are used in configuring sizes for transmissive parts to size may be maximum transmission efficiencies, average transmission efficiencies, 75% of the maximum transmission efficiencies, or based on other types of transmission efficiencies taken or derived from measurement.

For the purpose of illustrating a clear example, the transmission efficiencies of the sub-pixels 100-1, 100-2, 100-3 relative to that of the green sub-pixel are 95%, 100%, and 95%, respectively. In various embodiments, transmission efficiencies may vary and thus have numbers different from the illustrative numbers stated herein. For example, transmission efficiencies may be 120%, 88%, and 100%, respectively.

Alternatively and/or optionally, the transmission efficiencies may be expressed relative to different reference efficiency that is not necessarily associated with the green sub-pixel or with any actual sub-pixel in the pixel. For example, transmission efficiencies may be expressed relative to nominal transmission efficiency which may or may not set to 100%. In an embodiment, the transmission efficiencies may be 105%, 95%, and 105% respectively.

For the purpose of determining relative sizes of the areas of the transmissive parts, the relative sizes do not have to be strictly proportional to the transmission efficiency as described above. In some embodiments, the ratio of the areas of different color sub-pixels may only be in part based on the transmission efficiency. For example, a linear, non-linear, analytical, or non-analytical function that uses one or more transmission efficiencies of the sub-pixels as independent variables may be used.

Additionally and/or alternatively, offsets and/or scaling factors may be used to size these relative sizes to absolute sizes. These offsets and/or scaling factors may be set based on dimensions of the LCD, dimensions of pixels, power consumption consideration, readability consideration, designated lighting conditions, etc. Furthermore, in these embodiments, no reference color such as the green color as illustrated above needs to be chosen in determining the relative sizes of the areas of the transmissive parts of the sub-pixels in the pixel.

For the purpose of determining relative sizes of the areas of the transmissive parts, a different color may be chosen as the reference color instead of the green color as described above; similar analysis applies with the different reference color. For the purpose of determining relative sizes of the areas of the transmissive parts, a different color system may be chosen instead of the RGB system as described above; similar analysis applies with the different color system. Furthermore, such a color system needs not be a tri-color system, but may include four or more sub-pixels of four colors, five colors, etc. in a pixel.

4. Size Compensation for Reflective Parts

In some embodiments, sub-pixels may or may not be the same in size, as viewed by a viewer of the LCD from top. For the purpose of illustration only, in FIG. 2, both the sub-pixels 100-1 and 100-3 may be larger than the sub-pixel 100-2 in size. To set different areas for the sub-pixels of the pixel 208, in various embodiments the pixel 208 may be configured with certain portions that add areas to one or more sub-pixels and reduce area(s) to one or more other sub-pixels.

For example, a portion of area 304-1 may be configured in the pixel 208-1 to add an area to the sub-pixel 100-1 and to reduce an area of the sub-pixel 100-2. Additionally and/or optionally, a portion of area 304-2 may be configured in the pixel 208-1 to add an area to the sub-pixel 100-3 and to reduce an area of the sub-pixel 100-2. In various embodiments, zero, one, or more additionally provisioned areas such as 304-1 or 304-2 in FIG. 2 may be used to configure area sizes of sub-pixels in a pixel to different values.

In some embodiments, even though the areas of sub-pixels in a pixel as described herein may be different, and/or the areas of transmissive part color filters may be different, the areas of the reflective parts in the pixel, which are not covered by color filters, in all the sub-pixels of the pixel are configured to be substantially the same.

As used herein, the terms "substantially the same" or "substantially similar" or "equal in size" refer to a difference within a range or percentage and do not refer to strict equality. In an embodiment, reflective areas are substantially the same if the smallest and the largest of these reflective areas only differ within a specified range, for example, <=5%. In other embodiments, reflective areas are substantially the same if the smallest and the largest of these reflective areas only differ within a specified range which may be greater or less than 5%. The specified range for being the substantially the same may be set to be 1%, 3%, 10%, 25%, 40%, 51%, etc.

5. White Point Adjustment Using Color Filters Over Reflective Parts

In various embodiments, a pixel as described herein may use no color filters, or use color filters only over transmissive parts, or use only color filters over reflective parts, or use color filters fully or partially over both transmissive parts and reflective parts.

FIG. 3A illustrates an example top-view structure of an example pixel such as the pixel 208-1, according to an embodiment.

In an embodiment, transmissive parts 112-1, 112-2, 112-3 impart red, green and blue color to light, respectively, to form a color pixel, if the (Red-Green-Blue) RGB color system is used. In other embodiments, transmissive parts 112-1, 112-2, 112-3 can impart different colors such as red, green, blue and white or other color combinations, if other color systems are chosen.

In some embodiments, transmissive part color filters 204-1, 204-2, 204-3 of different thicknesses can be placed over transmissive parts 112-1, 112-2, 112-3, respectively, to decrease or increase saturation of the color imparted to the color pixel. Saturation is defined as intensity of a specific gradation of color within the visible spectrum. Further, one or more colorless filters can be placed over reflective parts 110-1, 110-2, 110-3. In various embodiments, the thickness of colorless filters can vary from zero to more than the thickness of transmissive part color filters 204-1, 204-2, 204-3 placed over transmissive parts 112-1, 112-2, 112-3.

Additionally and/or optionally, the transmissive part color filters 204-1, 204-2, 204-3 can be hexagonal, rectangular, octagonal, circular or so forth. Additionally and/or optionally, the shape of sub-pixels 100-1, 100-2, 100-3 can be rectangular, circular, octagonal, and the like.

A color filter may substantially cover one or more transmissive parts. As used herein, "substantially cover" means that the transmissive part color filter may cover most of the area of the transmissive part as viewed from top, may cover exactly the area of the transmissive part, or may cover a larger area than the area of transmissive part. In some embodiments, as illustrated in FIG. 3A, the transmissive part color filters 204-1, 204-2, 204-3 may be configured to cover more than the area of the transmissive parts 112-1, 112-2, 112-3.

In some embodiments, reflective part color filters, which are disjoint from transmissive part color filters covering transmissive parts, may be placed over one, two, three, or more reflective parts of sub-pixels in a pixel as described herein.

These reflective part color filters may be used to provide compensating colors that help create a new white point for the sub-pixels in the pixel in monochromatic operating modes. With the new white point, the sub-pixels of the pixel can be used to represent various shades of gray with little color tinge or with a particular desired color tinge, collectively or individually.

These reflective part color filters may also be used to provide compensating colors that help create a new color gamut including a new white point for the pixel in operating modes that use ambient light. These operating modes may include a transflective operating mode under which both backlight and ambient light is used to provide light to the pixel. The pixel can be used to represent various color values in the new color gamut with little color tinge, or alternatively and/or optionally, a different desired color tinge.

As illustrated in FIG. 3A, the pixel 208-1 has a reflective part color filter 302-5 that is disjoint from the transmissive part filters 204-1, 204-2, 204-3 and that partially covers a portion of a reflective part of only one sub-pixel, that is, the sub-pixel 100-2.

6. White Point Adjustment Using Overlapping Reflective Part Color Filters

Figure 3B:
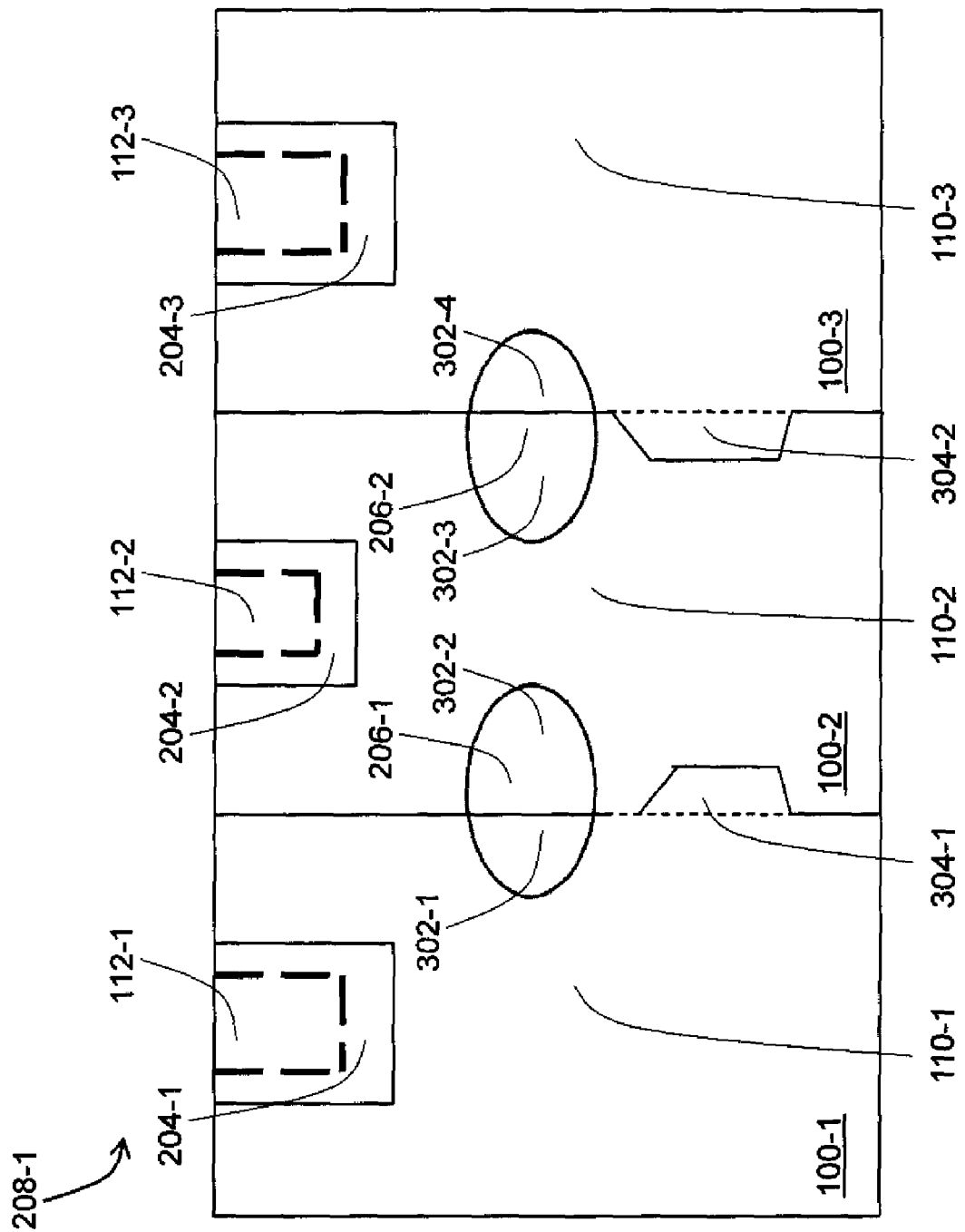
FIG. 3B illustrates a second example top plan view of structures of sub-pixels.

FIG. 3B illustrates an example top-view structure of an example pixel such as the pixel 208-1, according to an embodiment.

In some embodiments, as viewed by a viewer of the LCD from top, a reflective part may comprise a first portion of area not covered by any color filters. Additionally and/or optionally, the reflective part may comprise a second portion of area covered by a transmissive part color filter. For example, the reflective parts 110-1, 110-2, 110-3 may be partially covered by overhanging portions of the transmissive part color filters 204-1, 204-2, 204-3, respectively. Additionally and/or optionally, the reflective part may comprise a third portion of area covered by a reflective part color filter. For example, the reflective parts 110-1, 110-2, 110-3 may be partially covered by the reflective part color filters 206-1 and 206-2.

In some embodiments, a reflective part color filter may partially cover only one sub-pixel as shown in FIG. 3A. However, a reflective part color filter may also cover two or more sub-pixels. For example, as illustrated in FIG. 3B, both reflective part color filters 206-1 and 206-2 comprise component reflective part color filters that cover more than one sub-pixel. The reflective part color filter 206-1 comprises a first component reflective part color filter 302-1 and a second component reflective part color filter 302-2. The first component reflective part color filter 302-1 partially covers the reflective part 110-1 of the sub-pixel 100-1, while the second component reflective part color filter 302-1 partially covers the reflective part 110-2 of the sub-pixel 100-2.

Similarly, the reflective part color filter 206-2 comprises a third component reflective part color filter 302-3 and a fourth component reflective part color filter 302-4. The third component reflective part color filter 302-3 partially covers the reflective part 110-2 of the sub-pixel 100-2, while the fourth component reflective part color filter 302-4 partially covers the reflective part 110-3 of the sub-pixel 100-3.

The reflective part color filter 206-1 may be used to impart a color that is different the color imparted by transmissive part color filter 204-1, and/or transmissive part color filter 204-2. For example, the reflective part color filter 206-1 may impart the blue color in both of the sub-pixels 100-1 and 100-2 in which the transmissive part color filters respectively impart the red and green colors.

Similarly, the reflective part color filter 206-2 may be used to impart a color that is different the color imparted by transmissive part color filter 204-2, and/or transmissive part color filter 204-3. For example, the reflective part color filter 206-2 may impart the red color in both of the sub-pixels 100-2 and 100-3 in which the transmissive part color filters respectively impart the green and red colors.

In some embodiments, the reflective part of the sub-pixel 100-1 has an area covered by the red transmissive part color filter 204-1 and another area covered by the blue reflective part color filter 206-1. The net result may be that the sub-pixel 100-1 receives red and blue color contributions from these areas covered by the color filters 204-1 and 206-1. A similar analysis can apply to the sub-pixel 100-3. Thus, a color tuning effect may be obtained by placing reflective part color filters in the reflective part of the sub-pixels in a pixel as described herein.

Additionally and/or alternatively, the reflective part of the sub-pixel 100-2 has a first area covered by the green transmissive part color filter 204-2, a second area covered by the blue reflective part color filter 206-1, and a third area covered by the red reflective part color filter 206-2. In some embodiments, the first area may be an overhanging portion of the transmissive part color filter 204-2 extending to cover a portion of the reflective part 110-2 of the sub-pixel 100-2 and is smaller than either of the second and third areas.

In some embodiments, the second and third areas may be configured or set to specific sizes or within a range of sizes, in order to create a desired white point, or a specific desired tinge, in monochromatic operating modes. One example criterion, on which the sizes of the color filter areas are based, is that an overall red and blue color contribution from the reflective part color filters 206-1, 206-2 can compensate the green color contribution from the transmissive part color filter 204-2 or an overall green tinge from other optical components in the LCD for the purpose of creating a particular white point.

In some embodiments, all, or most, of a reflective part in a sub-pixel may be either covered by colorless filters, or not covered by filters.

Embodiments may be configured for correcting color tinges other than green tinges. In various embodiments, the area covered by each of the transmissive part color filters 204-1, 204-2, 204-3 may be the same as, or larger than, the area of the respective transmissive part 112-1, 112-2, 112-3. For example, the transmissive part color filter 204-1 that covers the transmissive part 112-1 may have an area larger than the area of the transmissive part 112-1.

Additionally and/or optionally, the transmissive part color filters 204-2, 204-3 may have areas that are larger relative to the areas of the transmissive parts 112-2, 112-3. In these embodiments, the sizes of the transmissive part color filters 204-1, 204-2, 204-3 and the sizes of the reflective part color filters 206-1, 206-2 may be placed or sized in certain ways to create a particular white point.

In some embodiments, areas of transmissive part color filters in the pixel 208-1 may or may not be the same. For example, the area of a green transmissive part color filter 204-2 may be smaller than the areas of a red or blue transmissive part color filter 204-1, 204-3. In other embodiments, different transmissive part color filters other than a green transmissive part color filter may be the smallest in size.

The determination or configuration of the area sizes of the transmissive part color filters, for example, may depend on how much color contribution is needed from the color as imparted by the overhanging portion in order to effectuate a particular shift of a color gamut or white point. Alternatively and/or optionally, the determination or configuration of the area sizes of the transmissive part color filters, for example, may depend on a particular manufacturing process used to create the structures of the pixel. The determination or configuration of the area sizes of the transmissive part color filters may also depend on other factors including cost consideration.

In some embodiments, areas of reflective part color filters in the pixel 208-1 may or may not be the same. For example, the area of the blue reflective part color filter 206-1 may be the same as, or larger or smaller than, the areas of the red reflective part color filter 206-2.

In some embodiments, even though (1) the areas of sub-pixels in a pixel as described herein may be different, and/or (2) the areas covered by transmissive part color filters, if any, in the pixel may be different, and/or (3) the areas covered by reflective part color filters, if any, in the pixel may be different, areas of the reflective parts, which areas are not covered by color filters, in the pixel in all the sub-pixels of the pixel are configured to be substantially the same.

7. Example Overall White Point Adjustments

FIG. 4 illustrates example shifts or adjustments of white points for a pixel using techniques as described herein. A first color gamut 400-1 in an example chromaticity chart 404-1 represents the colors that can be expressed by sub-pixels if the area sizes of transmissive parts of the sub-pixels are set to be equal. The first color gamut 400-1 has a white point at point 402-1. When the sub-pixels are configured to set different areas for the transmissive parts, a pixel comprising these sub-pixels can produce colors within a second color gamut 400-2. The second color gamut 400-2 has a white point 402-2 that has been shifted or moved from the white point 402-1. In some embodiments, while the white point is shifted, the color gamut may be the same as before. In these embodiments, the second color gamut 400-2 may substantially be the same as the first color gamut 400-1. Thus, the areas of the transmissive parts of the sub-pixels may be configured so that a particular color gamut with a particular white point is reached. This white point may, but is not limited to, be the D65 point in the color space defined by the International Commission on Illumination (CIE).

In some embodiments, as previously described, transmissive part color filters and/or reflective part color filters may be used in sub-pixels of a pixel. The transmissive part color filters may have overhanging portions that extend away from the transmissive parts to cover a portion of reflective parts of the sub-pixels in the pixel. For example, an overhanging portion of the transmissive part color filter in a sub-pixel of the pixel may be determined or configured. Based in part on the area size of the overhanging portion of the transmissive part color filter and the color imparted by the transmissive part color filter, a pixel may feature zero, one, or more reflective part color filters that cover a disjoint portion of the reflective portion in the sub-pixel.

The configuration of the reflective part color filter(s), if any, may take into consideration the area size of the overhanging portion of the transmissive part color filter, the color imparted by the transmissive part color filter, and a desired white point in a chromaticity chart to reach when the pixel is transmitting light. In some embodiments, all sub-pixels in a pixel are configured to reach the same white point, or substantially the same white point within a specified range or within a specific region in the chromaticity chart. In some embodiments, sub-pixels in a pixel may be configured to reach two or more different white points in the chromaticity chart.

As illustrated in FIG. 4, a reflective part of a sub-pixel without any disjoint reflective part color filter may have a white point at 402-3 in an example chromaticity chart 404-2. Adding or configuring one or more disjoint reflective part color filters in the sub-pixel may allow the sub-pixel to have a white point 402-4 instead. Thus, the overhanging portion of a transmissive part color filer, if any, and zero, one, or more reflective part color filters may be configured in such a way as to reach a particular white point, for example, D65, in the chromaticity chart. In an embodiment, in reflective operating modes, sub-pixels may be used to represent different shades of gray with little color tinge, or alternatively and/or optionally, a different desired color tinge.

As illustrated in FIG. 4, a pixel without using techniques as described herein may have a color gamut 400-3 with a white point at 402-5 in an example chromaticity chart 404-3, when both ambient light and a system-provided light source such as a backlight unit are used, in some operating modes of the LCD. Configuring different sizes for transmissive parts of sub-pixels in the pixels, and/or adding/configuring one or more disjoint reflective part color filters in the sub-pixel may allow the pixel to have a color gamut 400-4 with a white point 402-6 instead.

Thus, the area sizes of the transmissive parts, the overhanging portion of a transmissive part color filter, if any, and zero, one, or more reflective part color filters may be configured to produce a particular color gamut with a particular white point, for example, D65, in the chromaticity chart. In an embodiment, in reflective operating modes, sub-pixels may be used to represent different colors with little color tinge, or alternatively and/or optionally, a different desired color tinge.

8. Computer Displays

Embodiments may be used in a variety of LCD applications. In an embodiment, an electronic apparatus comprises a processor and an LCD formed as described above in connection with FIG. 1 to FIG. 4. Examples of apparatus include video monitors, televisions, watches, clocks, and signs.

Further, embodiments may comprise computing devices such as laptop computers, notebooks, netbooks, handheld computers, personal digital assistants, cell phones, and other computers having an integral LCD that is formed as described herein and coupled to display driver circuitry that the computer can drive to cause a display.

Figure 5:
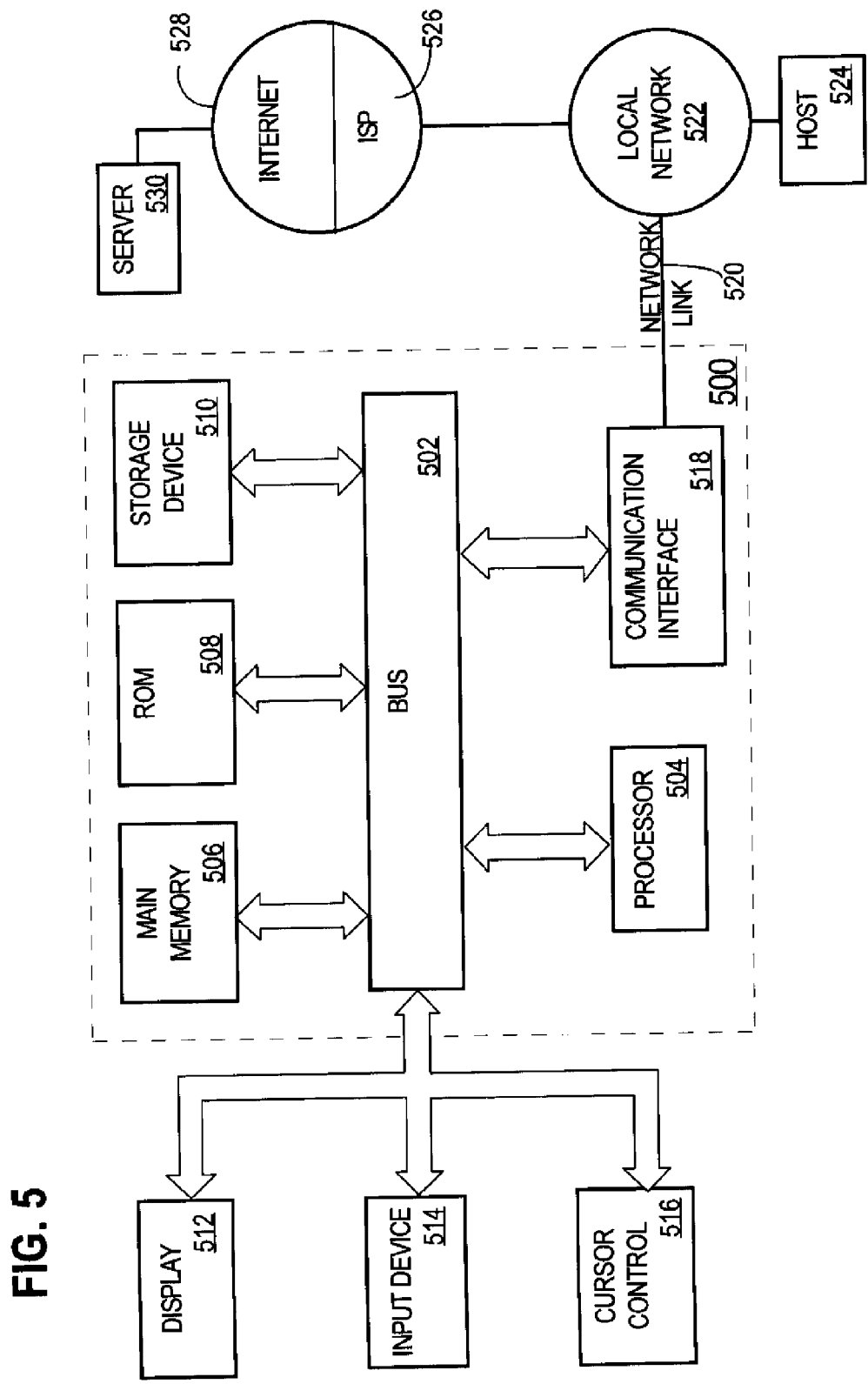
FIG. 5 illustrates a computer with which embodiments may be used.

For purposes of illustrating a clear example, FIG. 5 illustrates a computer system 500 with which embodiments may be implemented. In various embodiments, computer system 500 may comprise any of a laptop computer, notebook, netbook, handheld computer, personal digital assistant, cell phone, or another computer having an integral LCD. Special-purpose computing devices such as cell phones comprise additional hardware elements that are omitted in FIG. 5 for clarity, such as an antenna and cellular radiotelephone transceiver.

Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a liquid crystal display 512. The embodiments of FIG. 1, FIG. 2, FIG. 3A, FIG. 3B and FIG. 4 may be used with display 512. Computer system 500 may comprise a display driver circuit or chipset, separate or integrated with processor 504, configured to drive display 512 with individual LCD pixel display signals based on data that processor 504 writes to the display driver, or obtained directly from a specified part of main memory 506 to which the processor 504 writes data for display. Driver circuit 130 and timing controller 140 may be coupled to processor 504, for example, and to display 512.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

9. Extensions and Variations

For the purpose of illustrating a clear example, a pixel is illustrated with a rectangle. In various embodiments, viewed from top, a pixel may be formed as a polygon other than a rectangle, a circle, or any other geometric shape such as a combination of a half circle and a square. Similarly, a transmissive part may be formed in any geometric shape other than the rectangular shape shown in the drawings. Additionally and/or optionally, a transmissive part does not need to be aligned with an edge of a sub-pixel. For example, a transmissive part, as viewed from top, may be at the center, or located in other parts of the interior of a sub-pixel.

For the purpose of illustrating a clear example, a trapezoid portion is shown to add or reduce the area of a sub-pixel. In various embodiments, as viewed from top, other geometric shapes may be used to add or reduce the area of a sub-pixel. For example, a half circle may be used instead of a trapezoid.

For the purpose of illustrating a clear example, an ellipse has been used for illustrating a reflective part color filter. In various embodiments, as viewed from top, other geometric shapes may be used by a reflective part color filter. For example, a group of overlapped circles may be used by a reflective part color filter.

For the purpose of illustrating a clear example, a rectangle has been used for illustrating a transmissive part color filter. In various embodiments, as viewed from top, other geometric shapes may be used by a transmissive part color filter. Furthermore, a transmissive part color filter need not conform to a particular shape relative to the shape of a transmissive part that is substantially covered by the transmissive part color filter. For example, while a transmissive part color filter may be of a circular shape, a transmissive part color filter substantially covering the transmissive part color filter may be of a rectangular shape.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A liquid crystal display (LCD), comprising:
   a plurality of pixels, each pixel comprising three or more sub-pixels,
   wherein a first sub-pixel of the three or more sub-pixels comprises a first transmissive part that is covered by a first transmissive part color filter and that has a first transmissive area, and a first reflective part having a first reflective area;
   wherein a second sub-pixel comprises a second transmissive part that is covered by a second transmissive part color filter and that has a second transmissive area, and a second reflective part that has a second reflective area;
   wherein a third sub-pixel comprises a third transmissive part that is covered by a third transmissive part color filter and that has a third transmissive area, and a third reflective part that has a third reflective area;
   wherein the first transmissive color filter, the second transmissive color filter, and the third transmissive color filter impart three different colors;
   wherein at least two among the first transmissive area, the second transmissive area, and the third transmissive area are different in size, and wherein the first reflective area, the second reflective area, and the third reflective area are equal in size.

2. The LCD of claim 1, wherein a first reflective portion of the first reflective area is not covered by any color filter; wherein a second reflective portion of the second reflective area is not covered by any color filter; wherein a third reflective portion of the third reflective area is not covered by any color filter; wherein the first reflective portion, the second reflective portion, and the third reflective portion are substantially similar in area size.

3. The LCD of claim 1, wherein the first transmissive area, the second transmissive area, and the third transmissive area comprise sizes that are configured for a particular white point in a transmissive operating mode.

4. The LCD of claim 1, wherein the first reflective part is covered partially by one or more first reflective part color filters, and wherein at least one of the first reflective part color filters imparts a color different from the first transmissive part color filter.

5. The LCD of claim 4, wherein area sizes of the first reflective part color filters are configured for a particular white point in a reflective operating mode.

6. The LCD of claim 4, wherein the second reflective part is covered partially by zero or more second reflective part color filters, and wherein the third reflective part is covered partially by zero or more third reflective part color filters.

7. The LCD of claim 6, wherein area sizes of the first reflective part color filters, the second reflective part color filters, and the third reflective part color filters, and area sizes of the first transmissive part, the second transmissive part, and the third transmissive part, are configured for a particular white point in a transflective operating mode.

8. The LCD of claim 6, wherein a particular first reflective part color filter partially covering the first reflective part of the first sub-pixel is formed contiguously with a particular second reflective part color filter partially covering the second reflective part of the second sub-pixel.

9. The LCD of claim 1, wherein the first transmissive part color filter partially covers the first reflective part of the first sub-pixel.

10. A liquid crystal display (LCD), comprising:
a plurality of pixels, each pixel comprising three or more sub-pixels,
wherein a first sub-pixel of the three or more sub-pixels comprises a first transmissive part that has a first transmissive area, and a first reflective part having a first reflective area;
wherein a second sub-pixel comprises a second transmissive part that has a second transmissive area, and a second reflective part that has a second reflective area;
wherein a third sub-pixel comprises a third transmissive part that has a third transmissive area, and a third reflective part that has a third reflective area;
wherein at least two among the first transmissive area, the second transmissive area, and the third transmissive area are different in size;
wherein the first reflective area, the second reflective area, and the third reflective area are equal in size.

11. The LCD of claim 10, wherein a first reflective portion of the first reflective area is not covered by any color filter; wherein a second reflective portion of the second reflective area is not covered by any color filter; wherein a third reflective portion of the third reflective area is not covered by any color filter; wherein the first reflective portion, the second reflective portion, and the third reflective portion are substantially similar in area size.

12. The LCD of claim 10, wherein the first transmissive area, the second transmissive area, and the third transmissive area comprise sizes that are configured for a particular white point in a transmissive operating mode.

13. The LCD of claim 10, wherein the first reflective part is covered partially by one or more first reflective part color filters, and wherein at least one of the first reflective part color filters imparts a color different from a first transmissive part color filter substantially covering the first transmissive part.

14. The LCD of claim 13, wherein area sizes of the first reflective part color filters are configured for a particular white point in a reflective operating mode.

15. The LCD of claim 10, wherein a first transmissive part color filter substantially covering the first transmissive part partially covers the first reflective part of the first sub-pixel.

16. A computing device, comprising:
one or more processors;
a liquid crystal display (LCD), comprising:
a plurality of pixels, each pixel comprising three or more sub-pixels,
wherein a first sub-pixel of the three or more sub-pixels comprises a first transmissive part that is covered by a first transmissive part color filter and that has a first transmissive area, and a first reflective part having a first reflective area;
wherein a second sub-pixel comprises a second transmissive part that is covered by a second transmissive part color filter and that has a second transmissive area, and a second reflective part that has a second reflective area;
wherein a third sub-pixel comprises a third transmissive part that is covered by a third transmissive part color filter and that has a third transmissive area, and a third reflective part that has a third reflective area;
wherein the first transmissive color filter, the second transmissive color filter, and the third transmissive color filter impart three different colors;
wherein at least two among the first transmissive area, the second transmissive area, and the third transmissive area are different in size, and wherein the first reflective area, the second reflective area, and the third reflective area are equal in size.

17. The computing device of claim 16, wherein a first reflective portion of the first reflective area is not covered by any color filter; wherein a second reflective portion of the second reflective area is not covered by any color filter; wherein a third reflective portion of the third reflective area is not covered by any color filter; wherein the first reflective portion, the second reflective portion, and the third reflective portion are substantially similar in area size.

18. The computing device of claim 16, wherein the first transmissive area, the second transmissive area, and the third transmissive area comprise sizes that are configured for a particular white point in a transmissive operating mode.

19. The computing device of claim 16, wherein the first reflective part is covered partially by one or more first reflective part color filters, and wherein at least one of the first reflective part color filters imparts a color different from the first transmissive part color filter.

20. The computing device of claim 16, wherein area sizes of the first reflective part color filters are configured for a particular white point in a reflective operating mode.

21. The computing device of claim 16, wherein the first transmissive part color filter partially covers the first reflective part of the first sub-pixel.

22. A computing device, comprising:
one or more processors;
a liquid crystal display (LCD), comprising:
a plurality of pixels, each pixel comprising three or more sub-pixels,
wherein a first sub-pixel of the three or more sub-pixels comprises a first transmissive part that has a first transmissive area, and a first reflective part having a first reflective area;

wherein a second sub-pixel comprises a second transmissive part that has a second transmissive area, and a second reflective part that has a second reflective area;

wherein a third sub-pixel comprises a third transmissive part that has a third transmissive area, and a third reflective part that has a third reflective area;

wherein at least two among the first transmissive area, the second transmissive area, and the third transmissive area are different in size;

wherein the first reflective area, the second reflective area, and the third reflective area are equal in size.

23. The computing device of claim 16 comprising any of a laptop computer, notebook, netbook, handheld computer, personal digital assistant, or cell phone.

* * * * *